United States Patent
Lealao et al.

(10) Patent No.: US 7,036,724 B2
(45) Date of Patent: May 2, 2006

(54) SYSTEM FOR ENHANCING THE DATA STORAGE SECURITY OF CASH-FREE TRANSACTIONS IN VENDING MACHINES

(75) Inventors: Victoria Elizabeth Lealao, San Jose, CA (US); Robert Brooke Martin, San Jose, CA (US); Lewis Lee Nunnelley, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 10 days.

(21) Appl. No.: 10/836,882

(22) Filed: Apr. 30, 2004

(65) Prior Publication Data

US 2005/0242174 A1    Nov. 3, 2005

(51) Int. Cl.
*G06F 7/08* (2006.01)
(52) U.S. Cl. ........................ 235/381; 235/382
(58) Field of Classification Search ............... 235/381, 235/382, 385, 375; 705/18
See application file for complete search history.

(56) References Cited

U.S. PATENT DOCUMENTS

| | | | |
|---|---|---|---|
| 4,669,596 A | 6/1987 | Capers et al. | |
| 5,450,938 A | 9/1995 | Rademacher | |
| 5,641,050 A | 6/1997 | Smith et al. | |
| 5,650,761 A | 7/1997 | Gomm et al. | |
| 6,152,365 A | 11/2000 | Kolls | |
| 6,161,059 A * | 12/2000 | Tedesco et al. | 700/232 |
| 6,304,796 B1 | 10/2001 | Ding | |
| 6,505,095 B1 | 1/2003 | Kolls | |
| 6,539,282 B1 * | 3/2003 | Metcalf et al. | 700/237 |
| 2002/0099608 A1 | 7/2002 | Pons et al. | |
| 2002/0133269 A1 | 9/2002 | Anselmi | |
| 2003/0158624 A1* | 8/2003 | Kimura | 700/233 |
| 2004/0056085 A1* | 3/2004 | Adams | 235/379 |

FOREIGN PATENT DOCUMENTS

| | | |
|---|---|---|
| DE | 4037689 | 6/1992 |
| DE | 4039732 | 8/1992 |
| FR | 2723655 | 2/1996 |
| JP | 2300996 | 12/1990 |
| JP | 5151433 | 6/1993 |
| JP | 10031789 | 2/1998 |
| JP | 2001283302 | 10/2001 |
| JP | 2002109614 | 4/2002 |

\* cited by examiner

*Primary Examiner*—Karl D. Frech
*Assistant Examiner*—Lisa M. Caputo
(74) *Attorney, Agent, or Firm*—Bracewell & Giuliani LLP

(57) ABSTRACT

A vending machine has a nonvolatile data storage device for storing transactions with customers. The customers may use a number of cashless options to make purchases from the vending machine, including magnetic credit or debit cards, or universal vending cards. The transactions are stored on the storage device and later retrieved either locally or remotely. The security of the data is enhanced by requiring separate passwords for the data storage device, access to the data storage device, and, optionally for the vending machine controller. In addition, the data is inaccessible should the storage device become separated from the controller.

12 Claims, 3 Drawing Sheets

SYSTEM FOR ENHANCING THE DATA STORAGE SECURITY OF CASH-FREE TRANSACTIONS IN VENDING MACHINES

BACKGROUND OF THE INVENTION

1. Technical Field

The present invention relates in general to improving the security of transactions with vending machines and, in particular, to an improved system for enhancing the data storage security of cash-free transactions in vending machines.

2. Description of the Related Art

Vending machines typically comprise automated, point-of-sale mechanical devices that dispense a product or service to a user after cash, such as coins, is deposited by the user into the device for the purchase of a selection. Vending machines are well suited for the automated sale of food and beverages such as prepackaged snacks and candy, and canned or bottled beverages such as soft drinks, juices, or water. Vending machines are also used to sell non-food merchandise or services such as stamps, movie tickets, other consumables, and the like.

Ordinary vending machines have several shortcomings. For example, if a user does not have the exact amount of cash needed to make a purchase, the vending machine must make change to complete the transaction. To make change, the user is required to deposit an amount of cash in excess of the purchase price so that the machine can give back to the user the difference between the overage deposited by the user and the purchase price of the product. When a vending machine cannot make exact change, a purchase is usually blocked or a customer will choose to not make a purchase. Purchase blockages cause a loss of business to the machine's owner and a frustrated customer. In addition, most vending machines are coin operated, which adds considerable weight and volume for a relatively low concentration of monetary value. Thus, vending machines require frequent on-site service to manage the coinage.

In the prior art, there have been a number of solutions proposed for reducing the need to rely on cash transactions in vending machines. Most of these solutions prescribe the use of conventional credit card or debit card systems that require real-time validation to approve every transaction. However, many vending machines are located in remote, stand-alone environments that are not readily accessible to a data communications network. In such environments, it would be impractical if not impossible to validate and approve each transaction as it occurs. Moreover, vending machines that are located in some remote environments also may be prone to security violations such as theft of contents. Thus, what is needed is a system for using cash-free vending machines without compromising the data security of such transactions between the vending machine's owner and customers of the vending machine.

SUMMARY OF THE INVENTION

One embodiment of a system constructed in accordance with the present invention provides a vending machine with a nonvolatile storage device. A customer may use a number of cashless options, such as magnetic credit or debit cards, or a vending specific card to make purchases from the vending machine. The transaction is stored on the storage device and later retrieved either locally or remotely. The present invention also provides for a universal vending specific card that may be used on several different kinds of vending machines, and a universal vending machine card that may be purchased for cash and used for several kinds of vending machines and other transactions.

In another embodiment, the present invention provides a vending machine with a magnetic card reader that is connected with the nonvolatile storage device. The magnetic card reader is compatible with magnetic credit or debit cards. A typical magnetic card is constructed of plastic and has a magnetic stripe containing information that is read by the magnetic card reader. The nonvolatile storage device is preferably an inexpensive disk drive (e.g., a magnetic hard disk drive (HDD)), but also may be a tape drive, flash memory, static RAM or the like. A disk drive typically has a disk, a recording head, a motor, etc. A disk drive also has a disk drive controller that facilitates operation of the hardware of the disk drive and manages the flow of data through connection to external devices, such as a vending machine controller.

In addition to the magnetic card reader and the storage device, a relatively simple controller mediates communication between the magnetic card reader and the storage device. The controller also may be used to process purchase requests from customers and control output of the storage device. When a debit card is used, the amount to be deducted from the customer's account is stored using the storage device along with the account number.

Periodically, the information stored in the storage device may be transferred from the vending machine to collect the accounting information. This may be done locally at the physical site of the vending machine by downloading the information from the vending machine directly to a device such as a portable computer. This is a convenient method if a telephone line or other communication means are not physically present at the vending machine.

In yet another embodiment, the information stored in the storage device may be transferred by a radio frequency (RF) link. A small radio transmitter may be used as the output link connected with the storage device. A radio receiver may be connected with a device, such as a portable computer, to affect the transfer of information. In yet another embodiment, a hardware cable, such as a telephone line, may be used to collect the accounting information from a remote location for receiving the information. Alternatively, the vending machine may have a TCPIP address for more flexibility in downloading accounting information.

In another alternate embodiment, a debit card is used to make a purchase from the vending machine. A debit card is similar to a credit card but subtracts the purchase price directly from the card owner's account. Alternately, a universal vending machine card may be used. The universal vending machine card has a physical format similar to credit and debit cards so that the information recorded on the magnetic stripe may be read with the same magnetic card reader used to read credit and debit cards. The advantage of a universal vending machine card is that it may be purchased with cash. For example, a very young person who may not own a credit or debit card can purchase a universal vending machine card and thereby use the cash-free vending machines.

To provide additional security to the accounting information stored on the storage device, it is preferred to have a password for the vending machine controller and another password to access the storage device. In one version, the storage device requires a security handshake from the vending machine controller before allowing a password query. Should the storage device become separated from the vending machine controller, the data on the storage device would be very difficult (e.g., substantially inaccessible) to recover.

The present invention also provides a method of using a cash-free vending machine. A customer swipes a purchasing device such as a magnetic card through a reader in the vending machine and makes a purchase selection. The controller activates a mechanism that delivers the purchased good or service. After an optional authorization step, the controller also presents the purchase transaction information (e.g., price, account number, date and time of purchase, etc.) to the storage device for storage. The information is later recovered from the storage device for accounting purposes.

In an alternate embodiment, the present invention also provides enhanced data security for vending machines that do not rely, exclusively or otherwise, on cash transactions. This embodiment provides both physical and electronic security for the non-volatile storage device and the information therein. For example, the vending machine controller and the storage device are not visible from outside the vending machine. Another feature is that there is physical separation between the vending machine controller and the storage device. In addition, the storage device is inoperable unless used with the particular controller installed in the vending machine. If the vending machine is breached by a thief, the physical separation between the vending machine controller and the storage device reduces the chance of both being simultaneously stolen.

The vending machine controller controls the usual functions of the vending machine including logging the transactions and operating the mechanical and electrical components within the vending machine. A separate external connection allows communication from outside the vending machine. The external connection may be configured as a modem access, a port for directly connecting a computer, and the like. The vending machine controller also manages the movement of information from and to the storage device over a data buss. The data buss may comprise a known protocol such as ATA or SCSI. In addition, the vending machine controller operates an access key to the storage device, the communication path for which can be a dedicated buss. The access key also can be incorporated within the data buss structure.

The access key function of the vending machine controller provides a unique key that allows communication to proceed over the data buss to the storage device. In operation, the storage device must receive an access key password and a storage device password before any desired communication can occur from outside the vending machine. The access key password enables communication with the storage device controller. The storage device controller is commonly also protected with the storage device password. Therefore, any successful communication with the storage device must be preceded with the access key password and then the storage device password.

The access lock upon which the access key is operable is preferably located in the controller of the storage device. Thus, if the storage device becomes separated from the vending machine controller, a double password is required for access (i.e., the access key password followed by the storage device password). Furthermore, the storage device is unresponsive if the access key password is successful but the storage device password is not successful. Thus, if random passwords are used to attempt access to the storage device when it is not connected with the vending machine controller, there is no indication of partial success.

In one embodiment, the access key password is set once during initialization. After initialization, one configuration is to hide the access key password from even a legitimate user. Thus, each legitimate user can be logged and also be prevented from compromising security information to a third party. The operating mode would be for any legitimate user to make a connection with the vending machine controller and pass along a user identifier. When the controller recognizes the user identifier, the stored access key password is then passed to the storage device. The legitimate user then passes the storage device password, and communication to and from the storage device may proceed.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
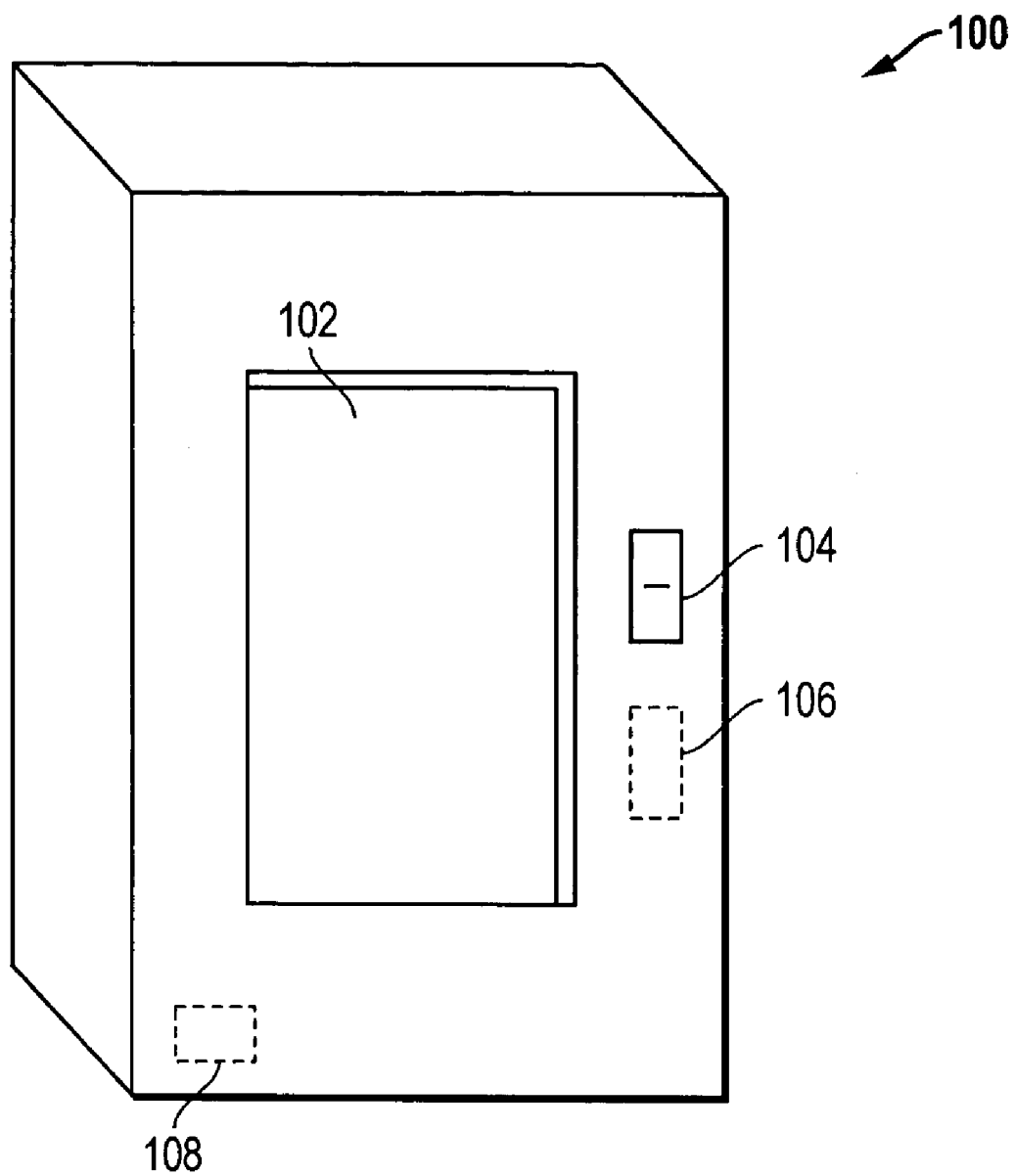
FIG. 1 is a schematic isometric view of a vending machine constructed in accordance with the present invention.

Referring to FIG. 1, one embodiment of a vending machine 100 and system constructed in accordance with the present invention is shown. The vending machine 100 has a vending mechanism 102, a device for inputting accounting data such as a card reader 104, a vending machine controller 106, and a data storage device 108. The card reader 104 can be configured to read credit cards, debit cards, universal vending machine cards, and the like. The data storage device 108 can be a non-volatile data storage device, such as a hard disk drive, static RAM, or flash memory. The vending mechanism 102 includes the mechanical and electrical apparatus for dispensing the product or service in response to payment received by the card reader 104. The vending machine controller 106 and the data storage device 108 are preferably not visible from the exterior of the vending machine 100.

One preferred feature of the present invention is physical separation between the vending machine controller 106 and the data storage device 108. As shown in FIG. 1, the vending machine controller 106 and the data storage device 108 may be separately located from each other within the vending mechanism 102. In addition, the data storage device 108 is inoperable unless used with the particular vending machine controller 106 installed in the vending machine 100. If the vending machine 100 is breached by a thief, the physical separation between the vending machine controller 106 and the data storage device 108 reduces the chances of both being stolen simultaneously.

Figure 2:
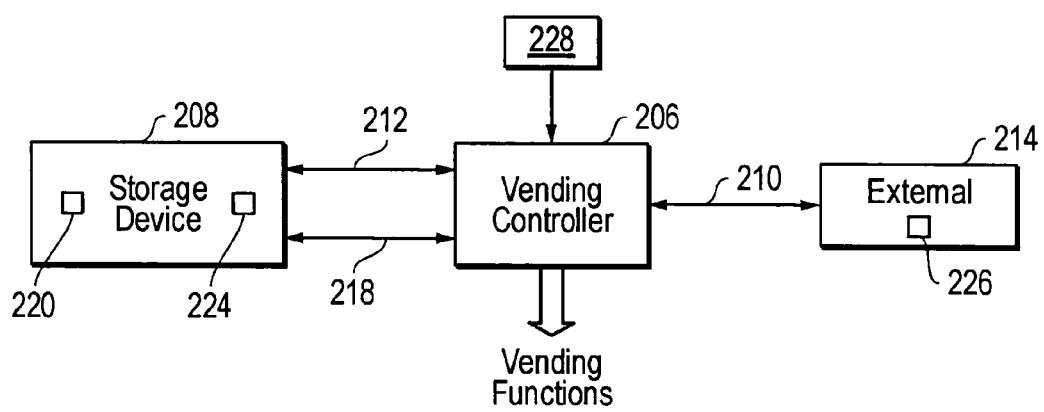
FIG. 2 is a schematic diagram of a control system for the vending machine of FIG. 1 and is constructed in accordance with the present invention.

Referring now to FIG. 2, a diagram of the vending machine controller 206 and the storage device 208 are shown. The vending machine controller 206 controls the usual functions 206 of the vending machine 100, including logging the transactions and controlling the operation of the mechanical and electrical apparatus 102 within the vending machine 100. A separate external connection 210 allows communication from outside the vending machine 100, such as to an external computer 214. The external connection 210 may be configured as a modem access, a port for directly connecting the external computer 214, a telephone line, a radio link, a TCPIP port, and the like. More specifically, the radio link may comprise a radio transmitter/receiver 224 connected with the data storage device 208, and a radio transmitter/receiver connected with the external computer 214. The vending machine controller 206 also manages the movement of information from and to the data storage device 208 over a data buss 218. The data buss 218 is most conveniently a known protocol such as ATA or SCSI.

The vending machine controller 206 operates an access key 212 (described in detail below) to the data storage device 208. The communication path for the access key 212 can be a dedicated buss. The access key 212 also can be incorporated within the structure of the data buss 218.

The access key function of the vending machine controller 206 provides a unique password called an access key that allows communication to proceed over the data buss 218 to the data storage device 208. In operation, any desired communication with the data storage device 208 must be preceded with an access key password. The access key password enables communication with the data storage device controller 220. The data storage device controller 220 is commonly also protected with a data storage device password. Therefore any successful communication with the data storage device 208 must be preceded with the access key password and then the data storage device password.

Figure 3:
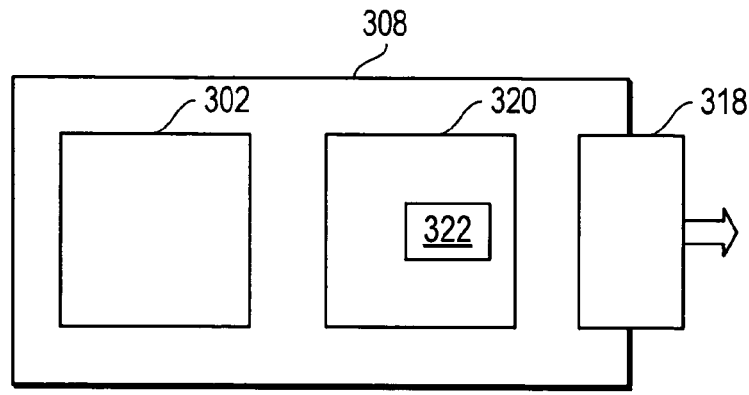
FIG. 3 is a schematic, high level diagram of a storage device for the vending machine of FIG. 1 and is constructed in accordance with the present invention.

FIG. 3 illustrates a high level diagram of a data storage device 308. The data storage device 308 typically has operational components 302, such as a disk, a recording head, a motor, etc. The data storage device 308 also has a data storage device controller 320 that facilitates operation of the hardware of the data storage device 308, and also manages the flow of data through the connection 318 to external devices, such as the vending machine controller 206. In one embodiment, the access lock 322 (upon which the access key 212 is operable) is preferably located in the data storage device controller 320. Thus, if the data storage device 308 becomes separated from the vending machine controller 206, two different passwords are required for access to the data (i.e., the access key password followed by the data storage device password). Furthermore, the data storage device 308 is unresponsive if the access key password is successful but the data storage device password is not successful. Thus, if random passwords are used to attempt access to the data storage device 308 when it is not attached to the vending machine controller 206, there is no indication of partial success.

The access key password is preferably set once during an initialization step. After initialization, one configuration is to hide the access key password from even a legitimate user. Thus, the interfaces with each legitimate user can be logged or tracked to prevent compromising the security of the data and information to a third party. The operating mode would be for any legitimate user to make a connection with the vending machine controller 206 and pass along an identifier. When the vending machine controller 206 recognizes the identifier, the stored access key password is then passed to the data storage device 208. The legitimate user then passes the data storage device password so that communication to and from the data storage device 208 may proceed. Each legitimate user may have a unique identifier. When a session with the storage device is requested, the vending machine controller may consult a list of identifiers to validate the user. The identifier may be stored along with the session record to increase accounting veracity.

In one embodiment, the present invention comprises a vending machine system 100 (FIG. 1) for selling a product or service to a customer during a transaction. The vending machine system 100 comprises a card reader 104 for accepting non-cash means of payment from the customer, such as a magnetic card reader that reads credit cards, debit cards, universal vending machine cards, etc. The vending machine system 100 includes a vending mechanism 102 for dispensing the product or service in response to payment received by the card reader 104. A data storage device 108 (e.g., a hard disk drive, a tape drive, flash memory, static RAM, etc.) records and stores the transaction with the customer, and has a data storage device password.

As shown in FIG. 2, communication means 210 are used to transfer data regarding the transaction to an external device 214. The communication means may comprise, for example, means for locally transferring data to and from a portable computer, a telephone line, an RF link, a TCPIP address. More specifically, the RF link may comprise a radio transmitter output link 224 connected with the data storage device 208 and a radio receiver 226 connected with the portable computer 214.

A vending machine controller 206 controls the card reader 104, the vending mechanism 102, access to the data storage device 208, and the communication means 210. The vending machine controller 206 passes an access key password that differs from the data storage device password. Preferably, the access key password is set once during initialization 228. In one version, the access key password operates as an access key for communication with a storage device controller 220 in the data storage device 208, such that both the access key password and the data storage device password are required to access the data storage device 208. The access key operates on an access lock that is located in the storage device controller 220.

The vending machine controller may optionally also be protected with a separate password. External access to the data storage device 208 and the vending machine controller 206 are limited by correct entry of the respective passwords. The data regarding the transaction is inaccessible if the data storage device 208 is disconnected from the controller 206. For additional security, the data storage device 108 is physically separated and spaced apart from the controller 106 inside the vending machine system 100.

Figure 4:
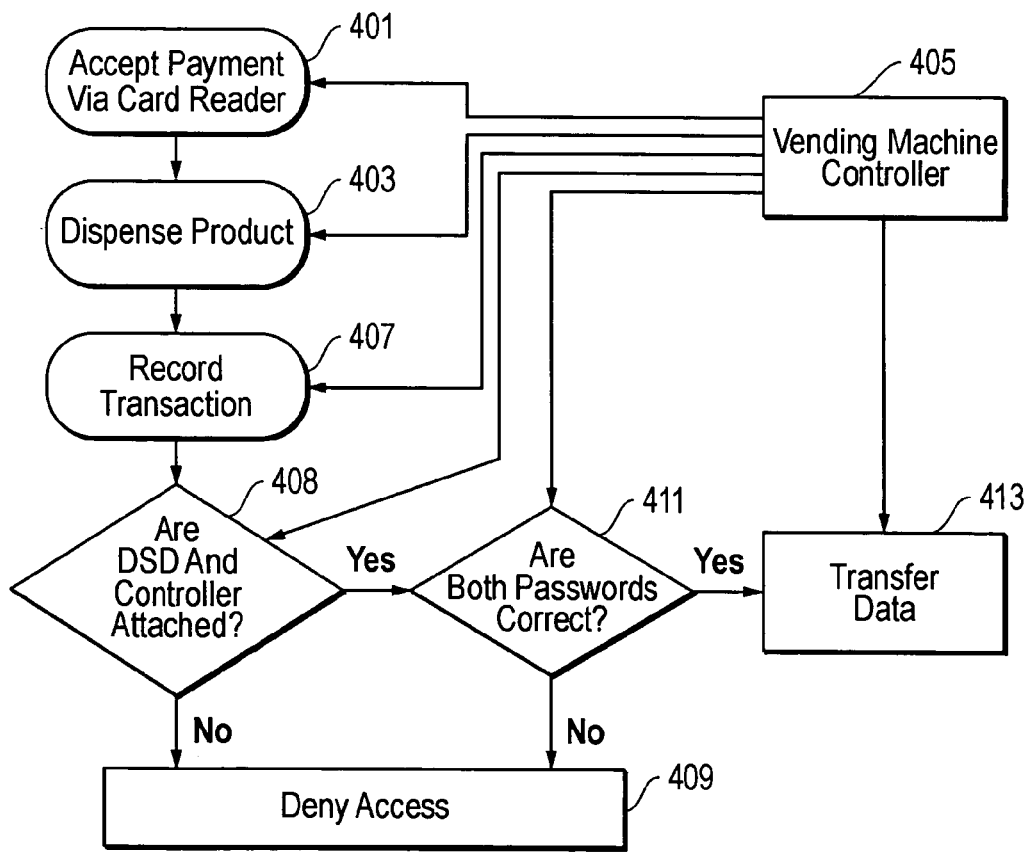
FIG. 4 is a flowchart of one embodiment of a method constructed in accordance with the present invention.

Referring now to FIG. 4, the present invention also comprises a method of securely operating a vending machine system that sells products or services to customers during transactions. As depicted at block 401, one embodiment of the method comprises accepting non-cash means of payment from the customer at a vending machine with a card reader. This step may comprise reading a credit card, a debit card, or a universal vending machine card with a magnetic card reader. A product or service sold by the system is dispensed from the vending mechanism in response to payment received from the customer, as illustrated at block 403. The data from this transaction are recorded and stored on the data storage device, as depicted at block 407. This step may comprise recording data on a hard disk drive, a tape drive, flash memory, static RAM, or the like.

As illustrated at block 405, the vending machine controller controls the card reader, the vending mechanism, and access to the data storage device. Access to the data regarding the transaction is denied (block 409) if the data storage device is separated from the controller (block 408). In addition, the accurate entry of two different passwords (block 411) for the access key and the data storage device are required to access the data; otherwise access is denied (block 409). A third password must be entered to gain access to the vending machine controller if it is password protected.

If the requisite steps are satisfactorily completed, the data is transferred regarding the transaction to an external device, as illustrated at block 413. This step may comprise transferring the data by means for locally transferring data to and from a portable computer, a telephone line, an RF link, a TCPIP address, etc. This step may further comprise connecting a radio transmitter output link of the RF link with the data storage, device and connecting a radio receiver with a portable computer. The method may further comprise separating the data storage device from the vending machine controller.

The present invention has many advantages over prior art designs. The vending machine system provides customers with multiple cashless options. The data storage device and control system are nonvolatile and relatively inexpensive. The information stored in the data storage device is readily transferred from the vending machine to collect the accounting information. This may be done many different ways, including either locally at the physical site of the vending machine, or remotely if communication means are available at the vending machine.

Additional security is provided by requiring two different passwords to gain access to the data storage device, and denial of access to the data in the event that the data storage device becomes separated from the controller. Furthermore, each legitimate user can be logged and prevented from compromising security information to a third party by attaching identifying information to every access attempt for every user.

While the invention has been shown or described in only some of its forms, it should be apparent to those skilled in the art that it is not so limited, but is susceptible to various changes without departing from the scope of the invention.

What is claimed is:

1. A vending machine system for selling a product or service to a customer during a transaction, comprising:
    a card reader for accepting non-cash means of payment from the customer,
    a vending mechanism for dispensing the product or service in response to payment received by the card reader;
    a data storage device for storing the transaction with the customer, the data storage device having a data storage device password;
    communication means for transferring data regarding the transaction to an external device;
    a vending machine controller for controlling the card reader, the vending mechanism, access to the data storage device, and the communication means, and the vending machine controller passing an access key password;
    external access to the data storage device and the controller are limited by correct entry of their respective passwords, and, in the event of a security breach wherein the data storage device is stolen from the vending machine system the data regarding the transaction is substantially inaccessible if the data storage device is disconnected from the controller; and wherein the access key password is set once during initialization.

2. The vending machine system of claim 1, wherein the card reader is a magnetic card reader that reads credit cards, and debit cards.

3. The vending machine system of claim 1, wherein the data storage device is selected from the group consisting of a hard disk drive, a tape drive, flash memory, and static RAM.

4. The vending machine system of claim 1, wherein the communication means is selected from the group consisting of: (a) means for locally transferring data to and from a portable computer, (b) a telephone line, (c) an RF link, and (d) a TCPIP address.

5. The vending machine system of claim 4, wherein the RF link comprises a radio transmitter output link connected with the data storage device and a radio receiver connected with a portable computer.

6. The vending machine system of claim 1, wherein the data storage device and the controller are physically separated and spaced apart from each other inside the vending machine system.

7. The vending machine system of claim 1, wherein a third password is required to gain access to the vending machine controller.

8. A vending machine system for selling a product or service to a customer during a transaction, comprising:
    a card reader for accepting non-cash means of payment from the customer;
    a vending mechanism for dispensing the product or service in response to payment received by the card reader;
    a data storage device for storing the transaction with the customer, the data storage device having a data storage device password;
    communication means for transferring data regarding the transaction to an external device;
    a vending machine controller for controlling the card reader, the vending mechanism, access to the data storage device, and the communication means, and the vending machine controller having an access key password, wherein the data storage device and the controller are physically separated and spaced apart from each other inside the vending machine system;
    external access to the data storage device and the controller is limited by correct entry of the access key password and the storage device password, a third password is required to gain access to the vending machine controller; and wherein
    the access key password is set once during initialization.

9. The vending machine system of claim 8, wherein the card reader is a magnetic card reader that reads credit cards, debit cards, and universal vending machine cards.

10. The vending machine system of claim 8, wherein the data storage device is selected from the group consisting of a hard disk drive, a tape drive, flash memory, and static RAM.

11. The vending machine system of claim 8, wherein the communication means is selected from the group consisting of: (a) means for locally transferring data to and from a portable computer, (b) a telephone line, (c) an RF link, and (d) a TCPIP address.

12. The vending machine system of claim 11, wherein the RF link comprises a radio transmitter output link connected with the data storage device and a radio receiver connected with a portable computer.

* * * * *